US012671116B2

(12) United States Patent
Otagiri et al.

(10) Patent No.: US 12,671,116 B2
(45) Date of Patent: Jun. 30, 2026

(54) POWER STORAGE DEVICE AND METHOD OF MANUFACTURING POWER STORAGE DEVICE

(71) Applicant: KABUSHIKI KAISHA TOYOTA JIDOSHOKKI, Kariya (JP)

(72) Inventors: Toshio Otagiri, Aichi-ken (JP); Hirokuni Akiyama, Aichi-ken (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 798 days.

(21) Appl. No.: 17/777,470

(22) PCT Filed: Nov. 12, 2020

(86) PCT No.: PCT/JP2020/042231
§ 371 (c)(1),
(2) Date: May 17, 2022

(87) PCT Pub. No.: WO2021/100598
PCT Pub. Date: May 27, 2021

(65) Prior Publication Data
US 2022/0407119 A1     Dec. 22, 2022

(30) Foreign Application Priority Data
Nov. 21, 2019     (JP) ................................. 2019-210535

(51) Int. Cl.
H01M 10/0585     (2010.01)
H01G 11/52     (2013.01)
(Continued)

(52) U.S. Cl.
CPC ..... H01M 10/0585 (2013.01); H01M 50/417 (2021.01); H01M 50/454 (2021.01);
(Continued)

(58) Field of Classification Search
CPC ........................... H01M 10/0585; H01G 11/52
See application file for complete search history.

(56) References Cited

U.S. PATENT DOCUMENTS 6,024,773 A * 2/2000 Inuzuka ............ H01M 10/0525
29/623.5
2004/0253512 A1* 12/2004 Watanabe ......... H01M 50/3425
429/185
(Continued)

FOREIGN PATENT DOCUMENTS

| JP | 2008-47400 A | 2/2008 |
| JP | 2010-062081 A | 3/2010 |
| JP | 2019-145724 A | 8/2019 |

OTHER PUBLICATIONS

Office Action issued Apr. 10, 2025 in Chinese Patent Application No. 202080080348.X.

*Primary Examiner* — Allison Bourke
*Assistant Examiner* — Verita E Grannum
(74) *Attorney, Agent, or Firm* — Sughrue Mion, PLLC

(57) ABSTRACT

A power storage device includes a positive electrode and a negative electrode facing each other, a separator disposed between the positive electrode and the negative electrode, the separator being porous, and a sealing member made of a resin and sealing a space between the positive electrode and the negative electrode. The separator includes a material having a melting temperature higher than a melting temperature of a resin material of the sealing member. The separator has an edge portion sandwiched and held in the sealing member in a state where the edge portion is joined to a melted-then-solidified portion of the resin material of the sealing member.

5 Claims, 7 Drawing Sheets

(51) Int. Cl.
  _H01G 11/80_ (2013.01)
  _H01G 11/84_ (2013.01)
  _H01M 50/417_ (2021.01)
  _H01M 50/454_ (2021.01)

(52) U.S. Cl.
  CPC .............. _H01G 11/52_ (2013.01); _H01G 11/80_
  (2013.01); _H01G 11/84_ (2013.01)

(56)                  References Cited

U.S. PATENT DOCUMENTS

| | | | | |
|---|---|---|---|---|
| 2018/0254448 A1* | 9/2018 | Aya | .................... | H01G 11/12 |
| 2021/0005934 A1* | 1/2021 | Yoda | .................... | H01M 4/668 |

* cited by examiner

FIG. 1

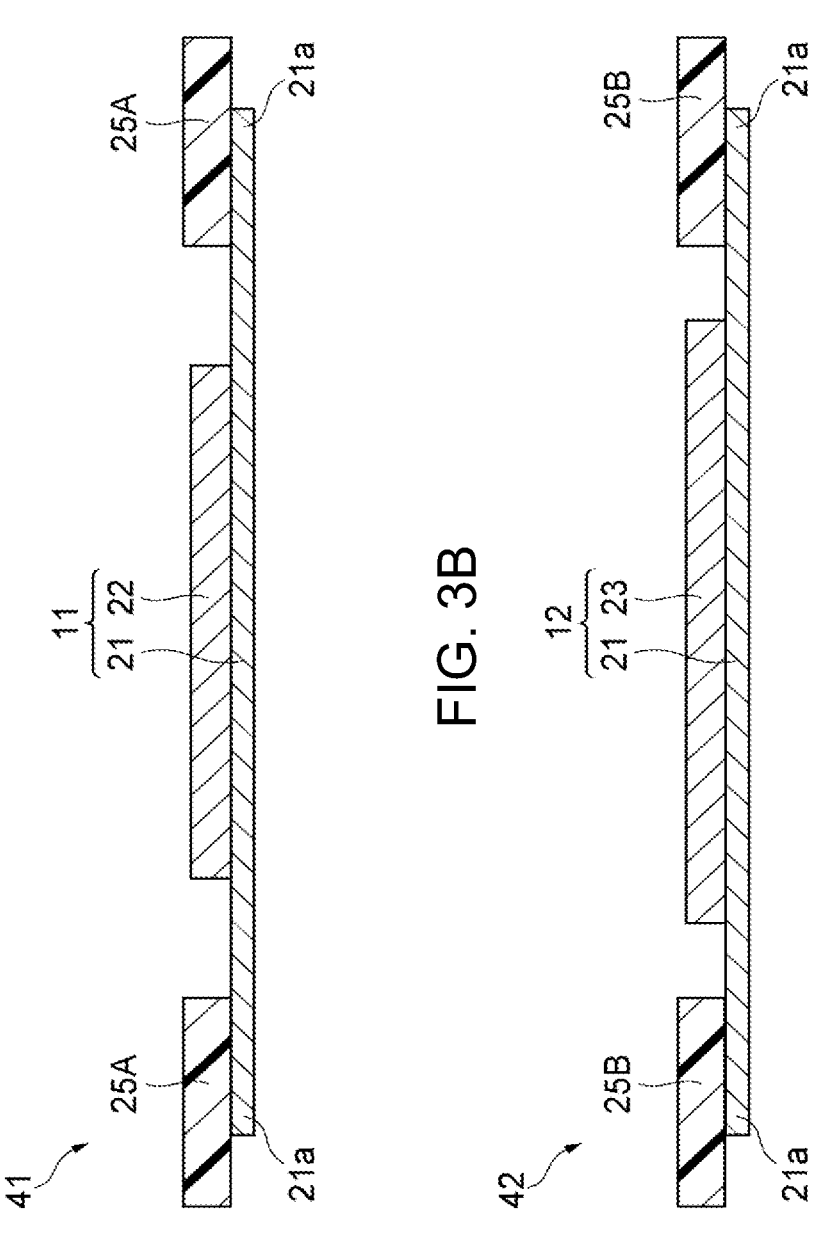

POWER STORAGE DEVICE AND METHOD OF MANUFACTURING POWER STORAGE DEVICE

CROSS REFERENCE TO RELATED APPLICATION

This application is a National Stage of International Application No. PCT/JP2020/042231 filed Nov. 12, 2020, claiming priority based on Japanese Patent Applications No. 2019-210535 filed Nov. 21, 2019, the contents of all of which are incorporated herein by reference in their entirety.

TECHNICAL FIELD

The present disclosure relates to a power storage device and a method of manufacturing a power storage device.

BACKGROUND ART

As a conventional power storage device, for example, a power storage device disclosed in Patent Document 1 has been known. This power storage device includes a separator disposed between a positive electrode and a negative electrode, and a sealing member for sealing a space between the positive electrode and the negative electrode. An edge portion of the separator is joined to the sealing member by welding.

CITATION LIST

Patent Document

[Patent Document 1] Japanese Patent Application Publication No. 2010-62081

SUMMARY OF THE INVENTION

Technical Problem

As in the above-mentioned power storage device, in order to suppress a short circuit between the positive electrode and the negative electrode due to shrinkage of the separator, a configuration in which the edge portion of the separator between the positive electrode and the negative electrode is joined to the sealing member by welding is considered. However, in some cases, a thickness of the separator is partially insufficient when the edge portion of the separator is welded to the sealing member. If the separator shrinks in this state, a part of the separator is stretched and breaks easily. The breakage of the separator causes the positive electrode and the negative electrode to face each other without the separator interposed therebetween, which may result in a short circuit between the positive electrode and the negative electrode.

The present disclosure is directed to providing a power storage device that suppresses a short circuit between a positive electrode and a negative electrode more reliably and a method of manufacturing the power storage device.

Solution to Problem

A power storage device according to one aspect of the present disclosure comprises: a positive electrode and a negative electrode facing each other; a separator disposed between the positive electrode and the negative electrode; and a sealing member made of a resin and sealing a space between the positive electrode and the negative electrode, wherein the separator includes a material having a melting temperature higher than a melting temperature of a resin material of the sealing member, the separator has an edge portion sandwiched in the sealing member in a state where the edge portion is joined to a melted-then-solidified portion of the resin material of the sealing member.

In this power storage device, since the edge portion of the separator is sandwiched in and held by the sealing member in a state in which the edge portion is joined to the melted-then-solidified portion of the resin material of the sealing member, displacement of the separator may be suppressed. This prevents the positive electrode and the negative electrode from facing each other without the separator interposed therebetween, so that a short circuit between the positive electrode and the negative electrode may be suppressed. Furthermore, the separator includes the material having the melting temperature higher than the melting temperature of the resin material of the sealing member, so that the edge portion of the separator may be joined to the melted-then-solidified portion in a state in which the shape of the edge portion is maintained without melting. Maintaining the shape of the separator in this way prevents the separator from being thinned partially. This may prevent breakage of the separator due to partial stretch of the separator even if the separator shrinks. As a result, since a state in which the separator is interposed between the positive electrode and the negative electrode can be maintained, a short circuit between the positive electrode and the negative electrode may be prevented more reliably.

The melted-then-solidified portion may be positioned on outer surface of the edge portion of the separator. In this case, the sealing member holds the edge portion of the separator with friction between the outer surface of the edge portion of the separator and the melted-then-solidified portion. This configuration permits securing the joining strength between the edge portion of the separator and the sealing member sufficiently, so that separation of the edge portion of the separator from the sealing member may be suppressed. As a result, since a state in which the separator is interposed between the positive electrode and the negative electrode may be maintained, the short circuit between the positive electrode and the negative electrode may be prevented more reliably.

The melted-then-solidified portion may be positioned in holes of the edge portion of the separator. The melted-then-solidified portion entering the holes of the edge portion of the separator in this manner offers an effect of anchoring at a joined portion where the edge portion of the separator and the sealing member are joined. This increases a joining strength between the edge portion of the separator and the sealing member, so that separation of the edge portion of the separator from the sealing member may be suppressed more reliably. As a result, since a state in which the separator is interposed between the positive electrode and the negative electrode may be maintained more reliably, the short circuit between the positive electrode and the negative electrode may be prevented more reliably.

The separator may include a first porous layer and a second porous layer stacked on each other, the first porous layer is made of a material having a melting temperature higher than the melting temperature of the resin material of the sealing member, the second porous layer is made of a material having a melting temperature lower than the melting temperature of the material of first porous layer, an edge portion of the first porous layer is joined to a first melted-then-solidified portion where the resin material of the sealing member is melted and then solidified, and an edge portion of the second porous layer may be integrally joined to a second melted-then-solidified portion where the material of the second porous layer and the resin material of the sealing member are melted and solidified. Joining the edge portion of the second porous layer to the second melted-then-solidified portion integrally in this way increases the joining strength between the edge portion of the separator and the sealing member, so that separation of the edge portion of the separator from the sealing member may be suppressed. Further, as described above, since the edge portion of the first porous layer is joined to the sealing member in a state in which the shape of the edge portion is maintained without being melted, the breakage of the separator resulting from the shrinkage of the separator may be suppressed. That is, the above-described configuration permits suppressing the breakage of the separator while suppressing the separation of the edge portion of the separator from the sealing member. Thus, since a state in which the separator is interposed between the positive electrode and the negative electrode can be maintained more reliably, a short circuit between the positive electrode and the negative electrode may be prevented more reliably.

The first porous layers may be stacked so as to sandwich the second porous layer. In this case, the breakage of the separator may be suppressed more reliably, while the separation of the edge portion of the separator from the sealing member is suppressed. Thus, since a state in which the separator is interposed between the positive electrode and the negative electrode can be maintained much more reliably, a short circuit between the positive electrode and the negative electrode may be prevented much more reliably.

A method of manufacturing a power storage device according to one aspect of the present disclosure is a method of manufacturing a power storage device that includes a positive electrode and a negative electrode facing each other, a separator disposed between the positive electrode and the negative electrode and being porous, and a sealing member made of a resin and sealing a space between the positive electrode and the negative electrode, the method including: a preparation process in which the separator including a material having a melting temperature higher than a melting temperature of a resin material of the sealing member is prepared; a placing process in which an edge portion of the separator is placed so as be sandwiched in the resin material of the sealing member; and a welding process in which the edge portion of the separator and the resin material of the sealing member are joined to each other by welding, wherein in the welding process, welding is performed at a temperature equal to or higher than the melting temperature of the resin material of the sealing member and lower than the melting temperature of the material of the separator.

In the method of manufacturing the power storage device, the edge portion of the separator is placed so as to be sandwiched in the resin material of the sealing member, and the edge portion of the separator and the resin material of the sealing member are joined to each other by welding. As a result, the edge portion of the separator is held with the edge portion sandwiched in the sealing member, which can suppress the displacement of the separator. This prevents the positive electrode and the negative electrode from facing each other without the separator interposed therebetween, so that a short circuit between the positive electrode and the negative electrode may be suppressed. In addition, since welding is performed at a temperature equal to or greater than the melting temperature of the resin material of the sealing member and less than the melting temperature of the material of the separator in the welding process, the edge portion of the separator may be joined to the sealing member without melting the separator while melting the sealing member at the welding. That is, the edge portion of the separator is joined to the sealing member in a state in which the shape of the edge portion of the separator is maintained without being melted. In this way, maintaining the shape of the separator prevents the separator from being thinned partially. This may prevent breakage of the separator due to partial stretch of the separator even if the separator shrinks. As a result, since a state in which the separator is interposed between the positive electrode and the negative electrode can be maintained, a short circuit between the positive electrode and the negative electrode may be prevented more reliably.

Advantageous Effects of Invention

According to the present disclosure, a short circuit between the positive electrode and the negative electrode may be suppressed more reliably.

BRIEF DESCRIPTION OF DRAWINGS

FIG. 1 is a schematic cross-sectional view illustrating a power storage device according to one embodiment.

FIG. 3A is a schematic cross-sectional view illustrating a method of manufacturing a power storage device according to one embodiment.

FIG. 3B is a schematic cross sectional view illustrating a process subsequent to FIG. 3A.

FIG. 4A is a schematic cross-sectional view illustrating a process subsequent to FIG. 3B.

FIG. 4B is a schematic cross-sectional view illustrating a process subsequent to FIG. 4A.

DESCRIPTION OF EMBODIMENTS

Figure 2:
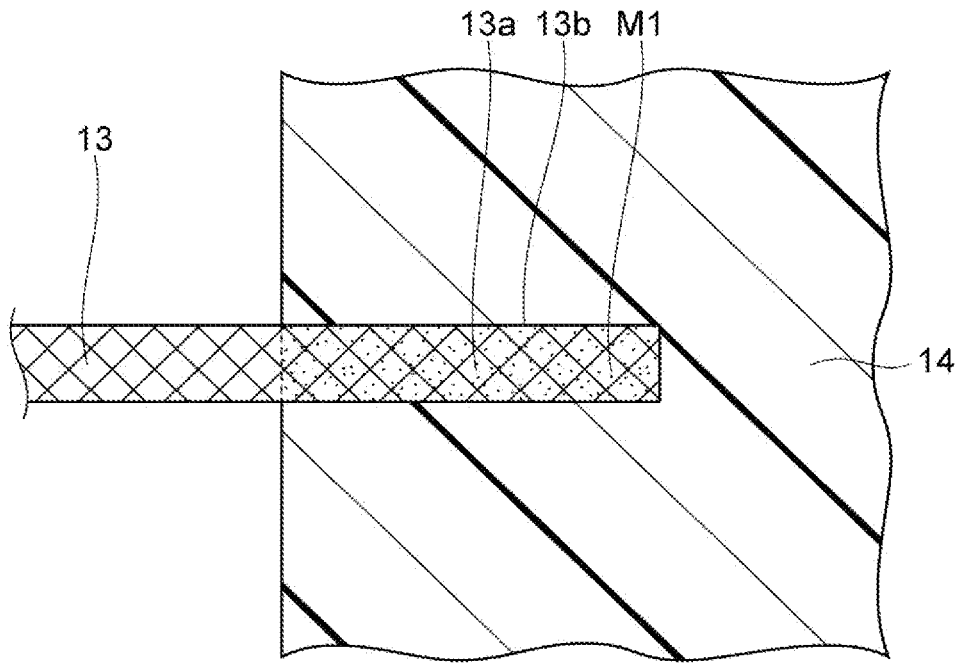
FIG. 2 is a partially enlarged-cross sectional view of the power storage device.

Hereinafter, an embodiment of a method of manufacturing an electrode plate according to one aspect of the present disclosure will be described with reference to the drawings. In the drawings, the same and equivalent members are designated by the same reference numerals and characters, and the repeated descriptions thereof will be omitted.

Figure 1:
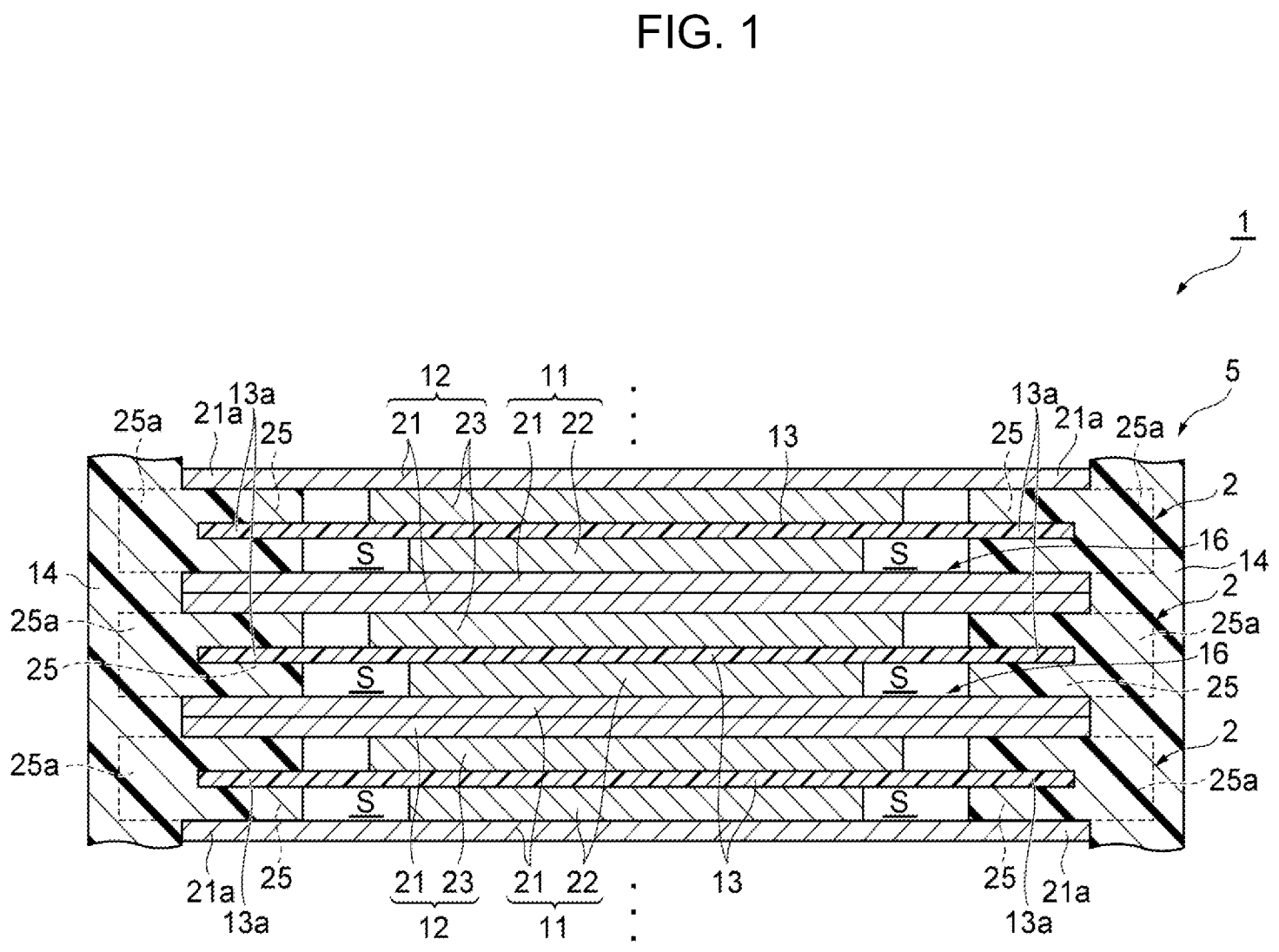

A power storage device 1 illustrated in FIG. 1 is a power storage module used for a battery of various vehicles such as a forklift truck, a hybrid vehicle, and an electric vehicle. The power storage device 1 is a secondary battery such as a nickel-hydrogen secondary battery or a lithium-ion secondary battery. The power storage device 1 may be an electric double layer capacitor, or an all-solid-state battery. In the present embodiment, an example of a case where the power storage device 1 is a lithium-ion secondary battery will be described.

The power storage device 1 includes a cell stack 5 in which power storage cells 2 are stacked in a stacking direction. As illustrated in FIG. 1, the power storage cells 2 each include a positive electrode 11, a negative electrode 12, a separator 13, and a sealing member 14. The positive electrode 11 is a rectangular electrode having a positive electrode active material layer 22 applied on one surface of a metal foil 21. The negative electrode 12 is a rectangular electrode having a negative electrode active material layer 23 applied on one surface of a metal foil 21. The negative electrode 12 is disposed so that the negative electrode active material layer 23 faces the positive electrode active material layer 22. In the present embodiment, each of the positive electrode active material layer 22 and the negative electrode active material layer 23 is applied in a rectangular shape. The negative electrode active material layer 23 is formed slightly larger than the positive electrode active material layer 22, and the entire applied region of the positive electrode active material layer 22 is positioned in the applied region of the negative electrode active material layer 23 in a plan view.

The power storage cells 2 are stacked so that the metal foils 21 of the positive electrodes 11 and the metal foils 21 of the negative electrodes 12 are in contact, thereby forming the cell stack 5. In the cell stack 5, the power storage cells 2, 2 disposed side by side in the stacking direction cooperate to form a simulated bipolar electrode 16 in which the metal foil 21 of the positive electrode 11 and the metal foil 21 of the negative electrode 12 in contact with each other serve as an electrode body.

The metal foils 21 may be a copper foil, an aluminum foil, a titanium foil, or nickel foil, for example. In view of securing a mechanical strength, the metal foils 21 may be a stainless steel foil (e.g. SUS304, SUS316, and SUS301 as defined in JIS G 4305:2015). The metal foils 21 may be an alloy foil of the above metals. If the metal foils 21 are an alloy foil, or a metal foil other than an aluminum foil, aluminum may be applied on the surface thereof.

The positive electrode active material layer 22 includes a positive electrode active material such as a composite oxide, metallic lithium, or sulfur, for example. The composition of the composite oxide includes at least one of iron, manganese, titanium, nickel, cobalt, and aluminum, and lithium, for example. An example of the composite oxide is olivine type lithium iron phosphate ($LiFePO_4$).

The positive electrode active material layer 22 includes a binder and a conductive assistant, in addition to the positive electrode active material. The binder secures the active material or the conductive assistant on a surface of a collector to maintain a conductive network in the electrode. Examples of the binder include fluorine-containing resins such as polyvinylidene fluoride, polytetrafluoroethylene, and fluorine rubber, thermoplastic resins such as polypropylene and polyethylene, imide-based resins such as polyimide and polyamide-imide, alkoxysilyl group-containing resins, acrylic resins such as polyacrylic acid resin and polymethacrylic acid resin, styrene-butadiene rubber (SBR), alginates such as carboxymethyl cellulose, sodium alginate, and ammonium alginate, water-soluble cross-linked cellulose ester, and starch-acrylic acid graft polymers. One of these binders may be used alone, or two or more of them may be used. For example, the conductive assistant is acetylene black, carbon black, graphite, or the like. As a viscosity adjusting solvent, for example, N-methyl-2-pyrrolidone (NMP) or the like is used.

The negative electrode active material layer 23 includes a negative electrode active material, examples of which include carbon such as graphite, artificial graphite, highly-oriented graphite, mesocarbon microbeads, hard carbon, and soft carbon, metal compounds, elements that can be alloyed with lithium or compounds thereof, boron-added carbon, and the like. Examples of the elements that can be alloyed with lithium include silicon and tin. A conductive assistant and a binder the same as those of the positive electrode active material layer 22 may be used.

The separator 13 is disposed between the positive electrode 11 and the negative electrode 12 facing each other. The separator 13 prevent a short circuit between bipolar electrodes 16, 16 disposed side by side when the power storage cells 2 are stacked. The separator 13 is a porous member having therein a plurality of holes and includes a material having a melting temperature higher than a melting temperature of a resin material forming the sealing member 14. As a material for the separator 13, for example, a porous film made of polypropylene (PP) is used. As a material for the separator 13, a woven fabric or a non-woven fabric made of polypropylene, methyl cellulose, or the like may be used. Although the present embodiment illustrates an example in which the entire separator 13 is made of a material having a melting temperature higher than the melting temperature of the resin material of the sealing member 14, a part of the separator 13 may be made of such a material. In the present specification, a melting temperature of a material means a temperature at which the material start melting, i.e., a melting point of the material.

The sealing member 14 is made of a resin, seals a space S between the positive electrode 11 and the negative electrode 12, and has an electric insulation property. The sealing member 14 has a rectangular frame shape in a plan view, and is welded to each of an edge portion 21a of the metal foil 21 of the positive electrode 11 and an edge portion 21a of the metal foil 21 of the negative electrode 12. As described below, the sealing member 14 is provided by a resin member 25 in which a resin portion 25A welded to the edge portion 21a of the metal foil 21 of the positive electrode 11 and a resin portion 25B welded to the edge portion 21a of the metal foil 21 of the negative electrode 12 are welded to each other (see FIGS. 3A and 3B).

The resin member 25 has edge portions, which correspond to protruded portions 25a each protruding outward from the edge portion 21a of the metal foil 21 of the positive electrode 11 and the edge portion 21a of the metal foil 21 of the negative electrode 12. In the cell stack 5, the protruded portions 25a of the resin member 25 are joined to each other by heat plate welding or the like. Thus, the sealing member 14 forms a rectangular frame surrounding an outer peripheral surface (a side surface) of the cell stack 5, and also functions as a sealing member that seals a space between the metal foil 21 of the positive electrode 11 and the metal foil 21 of the negative electrode 12 in contact with each other in the power storage cells 2, 2 disposed side by side in the stacking direction.

Examples of the resin material of the sealing member 14 include polyethylene (PE), polystyrene, ABS resin, modified polypropylene (modified PP), and acrylonitrile styrene (AS) resin. An electrolytic solution (not illustrated) is placed in the space S sealed by the sealing member 14. The electrolytic solution is a carbonate-based or polycarbonate-based electrolytic solution, for example. A supporting electrolyte contained in the electrolytic solution is lithium salt, for example. The lithium salt is, for example, $LiBF_4$, $LiPF_6$ $LiN(SO_2CF_3)_2$, $LIN(SO_2C_2F_5)_2$, or a mixture of these.

As illustrated in FIG. 2, an edge portion 13a of the separator 13 is embedded in the sealing member 14. Specifically, the edge portion 13a of the separator 13 is sandwiched in and held by the sealing member 14 with the edge portion 13a of the separator 13 joined to a melted-then-solidified portion M1 of the resin material of the sealing member 14. For example, when the edge portion 13a of the separator 13 and the sealing member 14 are joined to each other by welding such as heat welding or laser welding, the resin material of the sealing member 14 is melted and then solidified. The melted-then-solidified portion M1 corresponds to a portion of such a resin material that is melted and then solidified, the portion being positioned in the holes of the separator 13.

For example, the resin material of the sealing member 14 in a melted state enters the holes of the edge portion 13a of the separator 13 from an outer surface 13b of the edge portion 13a of the separator 13 and is solidified, which forms the melted-then-solidified portion M1 positioned in the holes of the edge portion 13a of the separator 13. The melted-then-solidified portion M1 positioned in the holes of the edge portion 13a of the separator 13 includes a case in which the melted-then-solidified portion M1 is formed to fill up the holes of the edge portion 13a of the separator 13 with no space, and a case in which the melted-then-solidified portion M1 is formed to fill only a part of the holes of the edge portion 13a of the separator 13.

Next, a method of manufacturing the above-described power storage device 1 will be described.

In manufacturing the power storage device 1, firstly, the positive electrode 11 formed of the positive electrode active material layer 22 applied on one surface of the metal foil 21, the negative electrode 12 formed of the negative electrode active material layer 23 applied on one surface of the metal foil 21, and the separator 13 including a material having a melting temperature higher than the melting temperature of the resin material of the sealing member 14 are prepared (a preparation process). Then, as illustrated in FIG. 3A, the resin portion 25A is joined to the edge portion 21a of the one surface of the metal foil 21 of the positive electrode 11 to form a positive electrode with a resin portion 41, and the resin portion 25B is joined to the edge portion 21a of the one surface of the metal foil 21 of the negative electrode 12 to form a negative electrode with a resin portion 42 (a forming process), as illustrated in FIG. 3B.

In the forming process, edge portions of the resin portions 25A, 25B are projected outward from the edge portions 21a of the metal foils 21 of the positive electrode 11 and the negative electrode 12. The thickness of the resin portion 25A of the positive electrode with the resin portion 41 and the thickness of the resin portion 25B of the negative electrode with the resin portion 42 may be equal to each other. In FIGS. 3A and 3B, the resin portions 25A, 25B are joined to the edge portions 21a of the one surfaces of the metal foils 21 by adhering. The resin portions 25A, 25B may be joined to the edge portions 21a of the one surfaces of the metal foils 21 by welding. In a case where the resin portions 25A, 25B are joined to the metal foils 21 by welding, heat may be applied to the resin portions 25A, 25B from the metal foils 21 side by using a heating means such as a heater, for example.

Figures 4A, 4B:
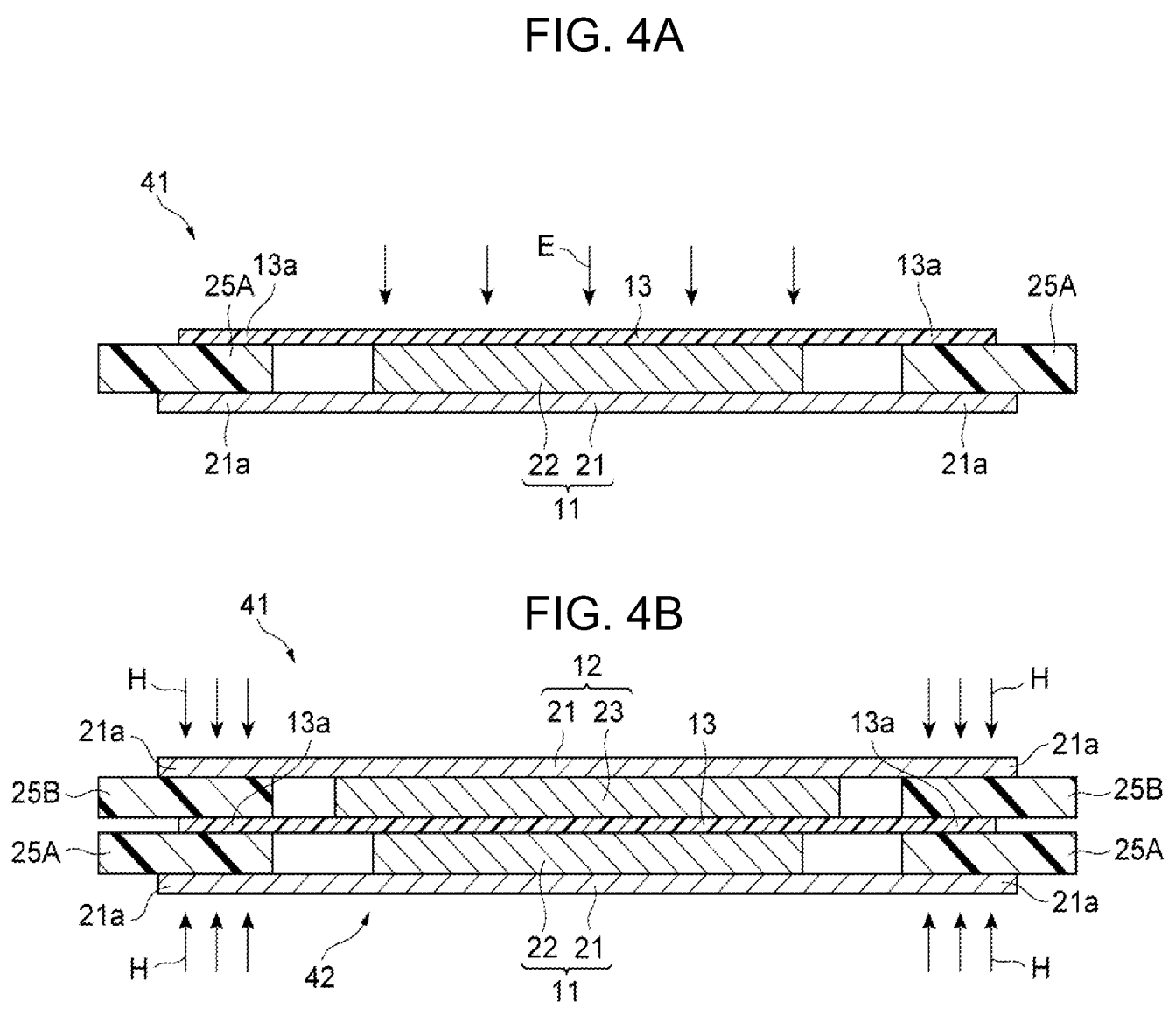

Subsequently, an electrolyte solution E is supplied by dripping after the separator 13 is placed on the active material layer of one of the positive electrode with the resin portion 41 and the negative electrode with the resin portion 42 (a solution dripping process). In the solution dripping process, as illustrated in FIG. 4A, the positive electrode with the resin portions 41 having a small applying area of the active material layer is used, and the separator 13 is placed on the positive electrode active material layer 22 of the positive electrode with the resin portion 41. At this time, the edge portion 13a of the separator 13 is layered on the resin portion 25A. The separator 13 is impregnated with the dripped electrolyte solution E.

After the electrolyte solution E is dripped, the positive electrode with the resin portion 41 and the negative electrode with the resin portion 42 are disposed so that the positive electrode active material layer 22 and the negative electrode active material layer 23 face each other (a placing process). In the placing process, as illustrated in FIG. 4B, the negative electrode with the resin portion 42 is stacked on the positive electrode with the resin portion 41 to which the electrolyte solution E is dripped so that the positive electrode active material layer 22 and the negative electrode active material layer 23 face each other. At this time, the edge portion 13a of the separator 13 is held between the resin portion 25A and the resin portion 25B.

Then, the edge portion 13a of the separator 13 is joined to the resin portion 25A of the positive electrode with the resin portion 41 and the resin portion 25B of the negative electrode with the resin portion 42 with each other by welding (a welding process). In the welding process, heat H is applied from each of the metal foil 21 of the positive electrode with the resin portion 41 and the metal foil 21 of the negative electrode with the resin portion 42. At this time, a temperature of the heat H at interfaces between the edge portion 13a of the separator 13 and the resin portions 25A, 25B is set at a temperature equal to or greater than the melting temperature of the resin portions 25A, 25B (e.g., 130° C.) and lower than the melting temperature of the separator 13 (e.g., 160° C.). Welding with the heat H of this temperature causes the resin portions 25A, 25B to melt, but does not cause the separator 13 to melt.

Thus, the edge portion 13a of the separator 13 is joined to the resin portions 25A, 25B in a state in which the edge portion 13a of the separator 13 is not melted and the shape thereof is maintained. In addition, the resin member 25 (see FIG. 1) is formed with the respective resin portions 25A, 25B joined to each other while being melted. In this way, the resin member 25 to which the edge portion 13a of the separator 13 is joined may be obtained. The portion of the resin member 25 positioned in the holes of the edge portion 13a of the separator 13 forms the melted-then-solidified portion M1 (FIG. 2) that is formed by solidification of the melted portion of the resin member 25.

Although FIG. 4B illustrates an example in which the edge portion 13a of the separator 13 and the resin portions 25A, 25B are joined to each other by heat welding using the heating means provided by the heater, the edge portion 13a of the separator 13 and the resin portions 25A, 25B may be joined to each other by laser welding. In this case, a laser having a wavelength that can be easily absorbed by the metal foil 21 is used. Heating the metal foil 21 by irradiating the metal foil 21 with the laser having such a wavelength allows the resin portions 25A, 25B to melt, so that the resin member 25 to which the edge portion 13a of the separator 13 is joined may be obtained.

The power storage cell 2 can be obtained through the above processes. A plurality of power storages cell 2 can be obtained by repeatedly executing the preparation process to the welding process. After the plurality of power storage cells 2 are obtained, the power storage cells 2 are stacked so that the metal foils 21 of the positive electrodes 11 and the metal foils 21 of the negative electrodes 12 are in contact, thereby forming the cell stack 5 (a cell stacking process), as illustrated in FIG. 1. After the cell stack 5 is formed, the heat H is applied to the protruded portions 25a of the resin members 25 of the power storage cells 2 to join the protruded portions 25a to each other. Thus, the sealing member 14 sealing the space between the metal foil 21 of the positive electrode 11 and the metal foil 21 of the negative electrode 12 of the power storage cells 2, 2 disposed side by side in the stacking direction is formed, so that the power storage device 1 illustrated in FIG. 1 is obtained.

Next, effects provided by the power storage device 1 and the method of manufacturing the power storage device 1 according to the present embodiment will be described. In the power storage device 1 of the present embodiment, since the edge portion 13a of the separator 13 is sandwiched in and held by the sealing member 14 in a state in which the edge portion 13a is joined to the melted-then-solidified portion M1 of the resin material of the sealing member 14, the displacement of the separator 13 may be suppressed. This keeps the positive electrode 11 and the negative electrode 12 from facing each other without the separator 13 interposed therebetween, which prevents a short circuit between the positive electrode 11 and the negative electrode 12. Furthermore, since the separator 13 includes the material having the melting temperature higher than the melting temperature of the resin material of the sealing member 14, the edge portion 13a of the separator 13 is joined to the melted-then-solidified portion M1 in a state in which the edge portion 13a is not melted and the shape thereof is maintained. Maintaining the shape of the separator 13 in this way prevents the separator 13 from being thinned partially. Accordingly, even if the separator 13 shrinks, breakage of the separator 13 due to partial stretching of the separator 13 may be prevented. As a result, since a state in which the separator 13 is interposed between the positive electrode 11 and the negative electrode 12 can be maintained, a short circuit between the positive electrode 11 and the negative electrode 12 may be prevented more reliably.

The melted-then-solidified portion M1 is positioned in the holes of the edge portion 13a of the separator 13. The melted-then-solidified portion M1 entering the holes of the edge portion 13a of the separator 13 in this manner offers an effect of anchoring at a joined portion where the edge portion 13a of the separator 13 and the sealing member 14 are joined. This increases a joining strength between the edge portion 13a of the separator 13 and the sealing member 14, so that separation of the edge portion 13a of the separator 13 from the sealing member 14 may be suppressed more reliably. As a result, since a state in which the separator 13 is interposed between the positive electrode 11 and the negative electrode 12 can be maintained more reliably, a short circuit between the positive electrode 11 and the negative electrode 12 may be prevented more reliably.

According to the method of manufacturing the power storage device 1 of the present embodiment, the edge portion 13a of the separator 13 and the resin portions 25A, 25B are joined to each other by welding with the edge portion 13a of the separator 13 placed so as to be sandwiched between the resin portions 25A, 25B.

As a result, the edge portion 13a of the separator 13 is held with the edge portion 13a sandwiched in the sealing member 14, which can suppress the displacement of the separator 13. This keeps the positive electrode 11 and the negative electrode 12 from facing each other without the separator 13 interposed therebetween, which prevents a short circuit between the positive electrode 11 and the negative electrode 12. In addition, since welding is performed at a temperature equal to or greater than the melting temperature of the resin portions 25A, 25B and less than the melting temperature of the separator 13 in the welding process, the edge portion 13a of the separator 13 can be joined to the sealing member 14 without melting the separator 13 while melting the sealing member 14 at the welding. That is, the edge portion 13a of the separator 13 is joined to the sealing member 14 in a state in which the edge portion 13a of the separator 13 is not melted and the shape thereof is maintained. In this way, maintaining the shape of the separator 13 prevents the separator 13 from being thinned partially. Accordingly, even if the separator 13 shrinks, breakage of the separator 13 due to partial stretching of the separator 13 may be prevented. As a result, since a state in which the separator 13 is interposed between the positive electrode 11 and the negative electrode 12 can be maintained, a short circuit between the positive electrode 11 and the negative electrode 12 may be prevented more reliably.

Although the power storage device 1 and the method of manufacturing the power storage device 1 according to one embodiment has been described above, the present disclosure is not limited to the above described embodiment, but may be modified in various manners without departing from technical idea of the present disclosure.

Figure 5:
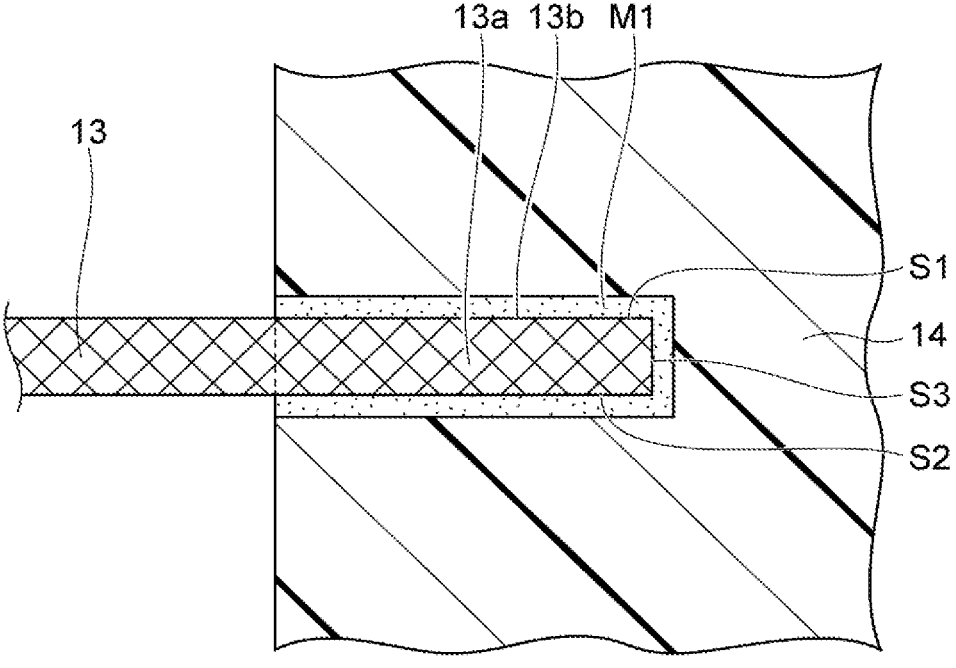
FIG. 5 is a partially enlarged cross-sectional view of a power storage device according to a first modified example.

Although a configuration in which the melted-then-solidified portion M1 is positioned in the holes of the edge portion 13a of the separator 13 has been described in the above-described embodiment, all the melted-then-solidified portion M1 may be positioned on the outer surface 13b of the edge portion 13a of the separator 13, as illustrated in FIG. 5. In other words, all the melted-then-solidified portion M1 may remain on the outer surface 13b of the edge portion 13a of the separator 13 without entering the holes of the edge portion 13a of the separator 13. In an example illustrated in FIG. 5, of a portion of the resin material of the sealing member 14, the portion being melted and then solidified, a part thereof positioned on the outer surface 13b of the separator 13 is referred to as the melted-then-solidified portion M1. In this example, the melted-then-solidified portion M1 is positioned on one surface S1 and the other surface S2 of the edge portion 13a of the separator 13 opposite from each other in the stacking direction and on a side surface S3 of the edge portion 13a of the separator 13 connecting the one surface S1 and the other surface S2. The melted-then-solidified portion M1 may be positioned on both of or only one of the one surface S1 and the other surface S2, or only on the side surface S3.

In the example illustrated in FIG. 5, the sealing member 14 holds the edge portion 13a of the separator 13 with friction between the outer surface 13b of the edge portion 13a of the separator 13 and the melted-then-solidified portion M1. This permits securing the joining strength between edge portion 13a of the separator 13 and the sealing member 14 sufficiently, so that separation of the edge portion 13a of the separator 13 from the sealing member 14 may be suppressed. As a result, since a state in which the separator 13 is interposed between the positive electrode 11 and the negative electrode 12 can be maintained more reliably, a short circuit between the positive electrode 11 and the negative electrode 12 may be prevented more reliably.

Figure 6:
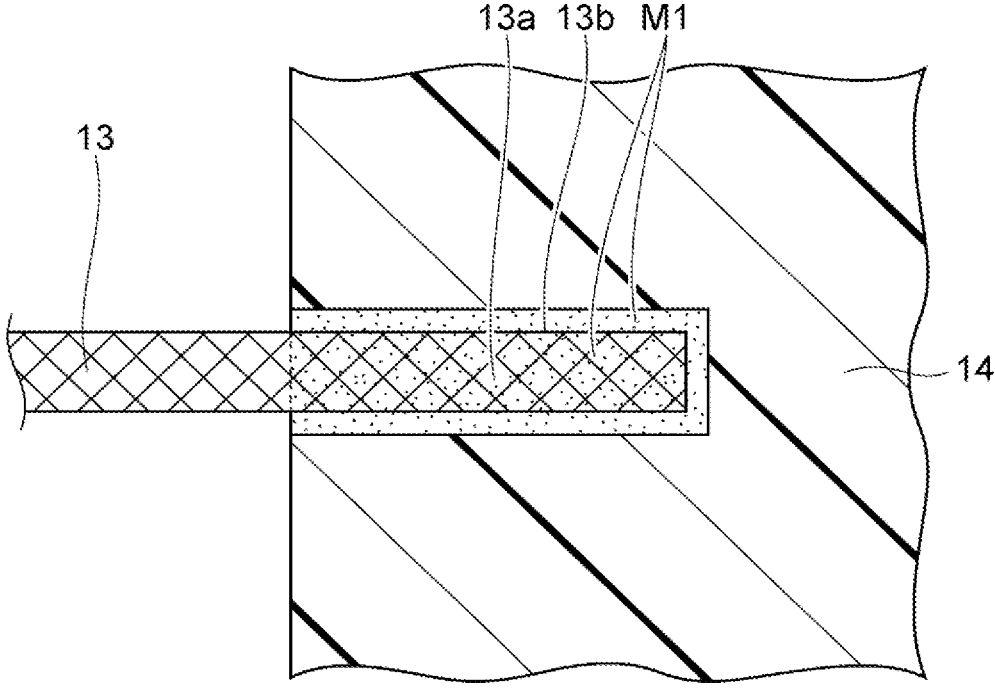
FIG. 6 is a partially enlarged cross-sectional view of a power storage device according to a second modified example.

Alternatively, as illustrated in FIG. 6, a portion of the melted-then-solidified portion M1 may enter the holes of the edge portion 13a of the separator 13 and the residual portion of the melted-then-solidified portion M1 may remain on the outer surface 13b of the edge portion 13a of the separator 13. That is, the melted-then-solidified portion M1 may be positioned both on the outer surface 13b of the edge portion 13a of the separator 13 and in the holes of the edge portion 13a of the separator 13. Even in this embodiment, the same effect as the above-described embodiment can be obtained.

Although a configuration in which the separator 13 has a single layer has been described in the above-described embodiment, the separator 13 may have multiple layers. In an example illustrated in FIG. 7, a separator 13A has a three-layer structure in which a porous layer 31A (a first porous layer), a porous layer 32 (a second porous layer), and a porous layer 31B (the first porous layer) are stacked in an order. That is, the separator 13 includes the porous layer 31A (the first porous layer) and the porous layer 32 (the second porous layer) that are stacked on each other. The porous layers 31A, 31B are stacked at positions so as to sandwich the porous layer 32, and have the same structure as each other. Similarly to the separator 13 of the above-described embodiment, the porous layers 31A, 31B are made of a material having a melting temperature higher than the melting temperature of the resin material of the sealing member 14.

On the other hand, the porous layer 32 is made of a material having a melting temperature lower than the melting temperature of the material of the porous layers 31A, 31B. As the material of the porous layer 32, for example, a porous film of polyethylene (PE) may be used. The melting temperature of the material of the porous layer 32 may be the same as the melting temperature of the resin material of the sealing member 14, or lower than the melting temperature thereof. That is, the material of the porous layer 32 may be the same as or different from the resin material of the sealing member 14. Additionally, although the porous layer 31A, the porous layer 32, and the porous layer 31B have the same thickness as each other in the example illustrated in FIG. 7, the porous layer 31A, the porous layer 32, and the porous layer 31B have different thicknesses from each other.

An edge portion 13c of the separator 13A (i.e., an edge portion 31a of the porous layer 31A, an edge portion 32a of the porous layer 32, an edge portion 31b of the porous layer 31B) is sandwiched in and held by the sealing member 14, similarly to the separator 13 of the above-described embodiment. Each of the edge portion 31a of the porous layer 31A and the edge portion 31b of the porous layer 31B is joined to the melted-then-solidified portion M1 (a first melted-then-solidified portion), similarly to the separator 13. The melted-then-solidified portion M1 joined to the edge portion 31a of the porous layer 31A is positioned only in the holes of the edge portion 31a of the porous layer 31A, and the melted-then-solidified portion M1 joined to the edge portion 31b of the porous layer 31B is positioned only in the holes of the edge portion 31b of the porous layer 31B.

On the other hand, the edge portion 32a of the porous layer 32 is joined to a melted-then-solidified portion M2 (a second melted-then-solidified portion) provided between the melted-then-solidified portion M1 joined to the edge portion 31a of the porous layer 31A and the melted-then-solidified portion M1 joined to the edge portion 31b of the porous layer 31B. The melted-then-solidified portion M2 is a portion where both the porous layer 32 and the sealing member 14 are melted and then solidified when the edge portion 32a of the porous layer 32 and the sealing member 14 are joined by welding with, for example, heat welding or a laser beam welding. Thus, the edge portion 32a of the porous layer 32 is integrally joined to the melted-then-solidified portion M2. In other words, the edge portion 32a of the porous layer 32 forms the melted-then-solidified portion M2.

When the edge portion 13c of the separator 13A and the sealing member 14 are joined to each other by welding, the temperature of the heat H at interfaces between the edge portion 13c of the separator 13A and the resin portions 25A, 25B is set at a temperature equal to or higher than the melting temperature of the porous layer 32, equal to or higher than the melting temperature of the resin portions

25A, 25B, and lower than the melting temperature of the porous layers 31A, 31B. When welding is performed with the heat H at this temperature, both the edge portion 32a of the porous layer 32 and the resin portions 25A, 25B are melted, but the porous layers 31A, 31B are not melted.

As a result, the edge portion 31a of the porous layer 31A and the edge portion 31b of the porous layer 31B are joined to the resin portions 25A, 25B in a state in which the edge portion 31a and the edge portion 31b are not melted and the shapes thereof are maintained. On the other hand, the edge portion 32a of the porous layer 32 is joined integrally to the resin portions 25A, 25B while being melted. The resin member 25 is formed by joining the edge portion 32a of the porous layer 32 and the resin portions 25A, 25B to each other while being melted. In this way, the resin member 25 to which the edge portion 13c of the separator 13A may be obtained. Of the resin member 25, both a portion positioned in the holes of the edge portion 31a of the porous layer 31A and a portion positioned in the holes of the edge portion 31b of the porous layer 31B form the melted-then-solidified portion M1 that is formed by solidification of the melted portion of the resin member 25. On the other hand, a portion of the resin member 25 joined to the edge portion 32a of the porous layer 32 forms the melted-then-solidified portion M2 formed by solidification of the melted portions of the melted porous layer 32 and the resin member 25.

In the separator 13A, joining the edge portion 32a of the porous layer 32 integrally to the melted-then-solidified portion M2 increases the joining strength between the edge portion 13c of the separator 13A and the sealing member 14, so that separation of the edge portion 13c of the separator 13A from the sealing member 14 may be suppressed. Further, similarly to the above-described embodiment, since the edge portion 31a of the porous layer 31A and the edge portion 31b of the porous layer 31B are joined to the sealing member 14 in a state in which the edge portion 31a and the edge portion 31b are not melted and the shapes thereof are maintained, the breakage of the separator 13A resulting from the shrinkage of the separator 13A may be suppressed. That is, the separator 13A permits suppressing the breakage of the separator 13A while suppressing the separation of the edge portion 13c of the separator 13A from the sealing member 14. Thus, since a state in which the separator 13A is interposed between the positive electrode 11 and the negative electrode 12 can be maintained more reliably, a short circuit between the positive electrode 11 and the negative electrode 12 may be prevented more reliably. Further, since the porous layer 31A and the porous layer 31B are stacked so as to sandwich the porous layer 32 therebetween in the separator 13A, the breakage of the separator 13A may be suppressed more reliably.

Figure 7:
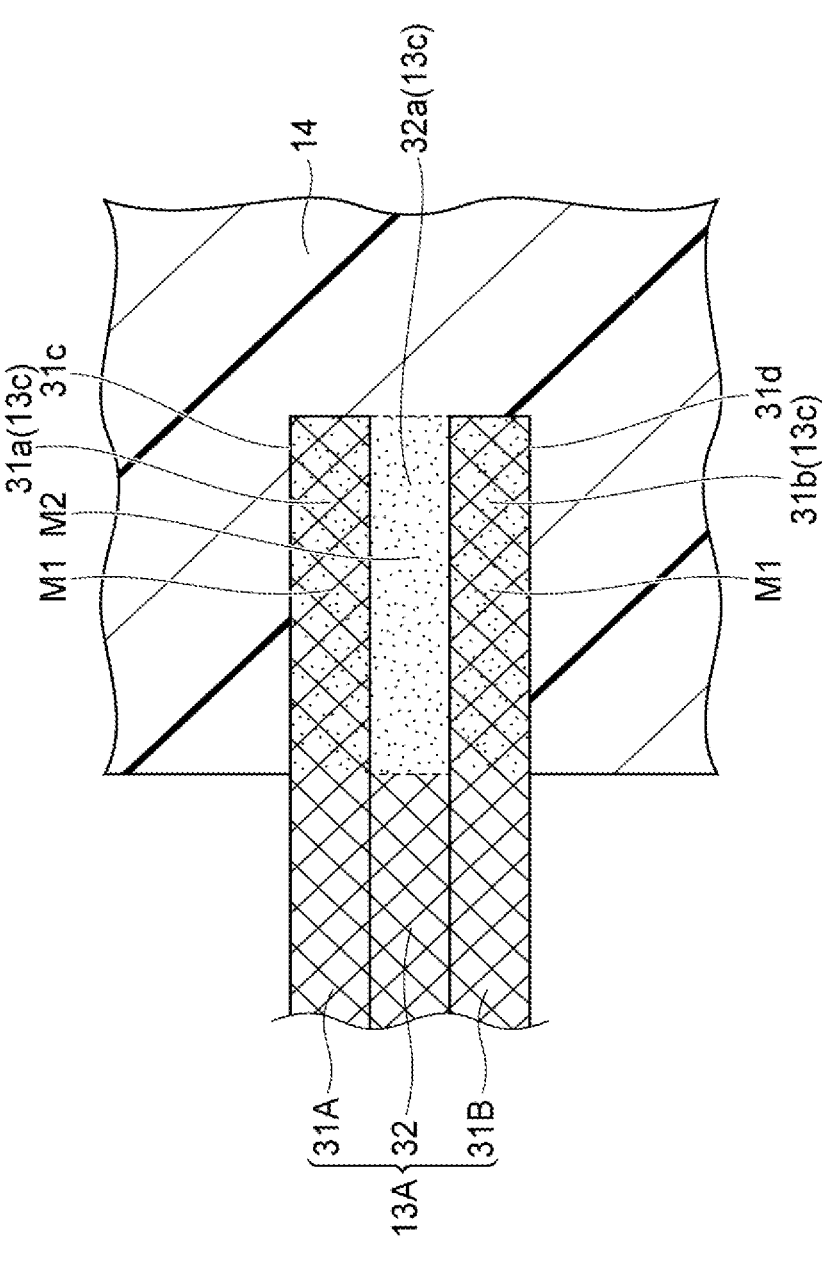
FIG. 7 is a partially enlarged cross-sectional view of a power storage device according to a third modified example.

Although the separator 13A having a three-layer structure is described in an example illustrated in FIG. 7, the separator may have a two-layer structure, or a multilayer structure having four or more layers. In a case where the separator has a two-layer structure, the separator may include a single porous layer 31A and a single porous layer 32. In a case where the separator has a multilayer structure having four or more layers, the separator may include a single porous layer 31A, or multiple porous layers 31A and a single porous layer 32 or multiple porous layers 32.

In the example illustrated in FIG. 7, a configuration in which the melted-then-solidified portion M1 joined to the edge portion 31a of the porous layer 31A is positioned in the holes of the edge portion 31a of the porous layer 31A, and the melted-then-solidified portion M1 joined to the edge portion 31b of the porous layer 31B is positioned in the holes of the edge portion 31b of the porous layer 31B is described. However, the melted-then-solidified portion M1 joined to the edge portion 31a of the porous layer 31A may be positioned only on the outer surface 31c of the edge portion 31a of the porous layer 31A, or both in the holes of the edge portion 31a of the porous layer 31A and on the outer surface 31c of the edge portion 31a of the porous layer 31A. Similarly, the melted-then-solidified portion M1 joined to the edge portion 31b of the porous layer 31B may be positioned only on an outer surface 31d of the edge portion 31b of the porous layer 31B, or both in the holes of the edge portion 31b of the porous layer 31B and on the outer surface 31d of the edge portion 31a of the porous layer 31B.

The configuration of the power storage device is not limited to the above-described embodiment and modified examples. For example, the above-described embodiment and modified examples may be combined to each other according to a necessary purpose and effect. Further, the configuration of the power storage device is not limited to the above-described embodiment, but may be modified suitably. For example, a cell stack may be formed by stacking bipolar electrodes, in which a positive electrode active material layer is formed on one surface of a single metal foil and a negative electrode active material layer is formed on the other surface of the metal foil, with separators interposed therebetween. In this case, the bipolar electrodes and the separators are stacked so that an edge portion of a separator is sandwiched by a resin portion joined to the one surface of the metal foil of one bipolar electrode and a resin portion joined to the other surface of the metal foil of a bipolar electrode facing the one bipolar electrode. The edge portion of the separator and the resin portions are joined to each other by performing laser welding from a side surface of a stacked body in which the bipolar electrodes and the separators are stacked. Even in this embodiment, the same effect as the above-described embodiment and the modified examples can be obtained.

REFERENCE SIGNS LIST

1 power storage device
11 positive electrode
12 negative electrode
13, 13A separator
13a, 13c, 21a, 31a, 31b, 32a edge portion
13b, 31c, 31d outer surface
14 sealing member
25 resin member

25A, 25B resin portion
31A, 31B porous layer (first porous layer)
32 porous layer (second porous layer)
M1 melted-then-solidified portion (first melted-then-solidified portion)
M2 melted-then-solidified portion (second melted-then-solidified portion)
S space

The invention claimed is:

1. A power storage device comprising: a cell stack in which power storage cells are stacked in a stacking direction; each of the power storage cells including: a positive electrode and a negative electrode facing each other; a separator disposed between the positive electrode and the negative electrode, the separator being porous; and a sealing member made of a resin and sealing a space between the positive electrode and the negative electrode, wherein the separator includes a material having a melting temperature higher than a melting temperature of a resin material of the sealing member, the separator has an edge portion sandwiched and held in the sealing member in a state where the edge portion is joined to a melted-then-solidified portion of the resin material of the sealing member, wherein the melted-then-solidified portion is uniform on an outer surface of the edge portion of the separator, and a protruded portion of the sealing member of adjacent ones of the stacked power storage cells are joined to each other.

2. The power storage device according to claim 1, wherein the melted-then-solidified portion is positioned in a hole of the edge portion of the separator.

3. The power storage device according to claim 1, wherein the sealing member includes a first resin portion welded to an edge of a metal foil of the positive electrode, and a second resin portion welded to an edge of a metal foil of the negative electrode, wherein the first resin portion and the second resin portion are welded to each other in each of the power storage cells.

4. The power storage device according to claim 3, wherein an edge of the first resin portion and an edge of the second resin portion protrude outward from the edge of the metal foil of the positive electrode and the edge of the metal foil of the negative electrode, respectively, to form the protruded portion of the sealing member.

5. The power storage device according to claim 1, wherein the protruded portion protrudes outward from the edge of the metal foil of the positive electrode and the edge of the metal foil of the negative electrode.

* * * * *